United States Patent [19]

Kashiwamura et al.

[11] Patent Number: 4,623,151

[45] Date of Patent: Nov. 18, 1986

[54] SEAL MEANS FOR A STIRLING ENGINE OR THE LIKE

[75] Inventors: Kazuo Kashiwamura, Amagasaki; Tadahiro Yoshida, Sakai; Toshihide Koda, Osaka; Michio Fujiwara, Akashi, all of Japan

[73] Assignee: Mitsubishi Denki Kabushiki Kaisha, Tokyo, Japan

[21] Appl. No.: 721,702

[22] Filed: Apr. 10, 1985

[30] Foreign Application Priority Data

Apr. 13, 1984 [JP] Japan .................................. 59-75333

[51] Int. Cl.[4] .......................... F16J 15/16; F16J 15/40

[52] U.S. Cl. .......................................... 277/24; 277/15; 277/17; 277/28

[58] Field of Search .......................... 277/2, 12, 15–21, 277/24, 28, 32

[56] References Cited

U.S. PATENT DOCUMENTS 3,161,413 12/1964 Audemar .......................... 277/15 X 3,887,195 6/1975 Vinciguerra ....................... 277/15 X 3,943,717 3/1976 Schexnayder ..................... 277/19 X 4,432,556 2/1984 Green et al. ....................... 277/15 X

*Primary Examiner*—Robert S. Ward

*Attorney, Agent, or Firm*—Birch, Stewart, Kolasch & Birch

[57] ABSTRACT

A seal means for use in the Stirling engine or the like, the seal means comprising: a cylinder including a piston reciprocating therein, and a buffer chamber located in one of the spaces produced at the both sides of the piston; a tank for storing the working fluid in the buffer chamber when the engine is at rest, the tank being located outside the cylinder; a means for introducing the working fluid in the tank into the buffer chamber under pressure when the engine is started; a crank shaft driven by means of the piston through a piston rod; a crankcase for accommodating the crank shaft; a plurality of packings for preventing the working fluid in the buffer chamber from entering the crankcase by flowing along the outer surface of the moving piston rod, the packings being arranged in contact with the outer surface of the piston rod; and a means for returning the working fluid leaked in the packings from the buffer chamber through the moving piston rod to the buffer chamber.

17 Claims, 5 Drawing Figures

(a)

SEAL MEANS FOR A STIRLING ENGINE OR THE LIKE

FIELD OF THE INVENTION

The present invention relates to a seal means, and more particularly, to a seal means especially for use in a Stirling engine.

BACKGROUND OF THE INVENTION

Generally, the Stirling engine requires that to ensure high efficiency a fluid having a relatively small molecular weight, such as hydrogen or helium, is adopted as working fluid and is sealed under high pressure.

To explain a prior art seal means used in the Stirling engine, reference will be made more particularly to FIG. 1:

In FIG. 1 there is provided a cylinder 1 including a piston 2 capable of moving up and down, the piston 2 having a piston rod 3. The reference numeral 4 designates a rolling seal, which is fixed to the piston rod 3 at its inner side, and to a seal support 5 at its outer side. The piston rod 3 is connected to a crosshead 7 which is guided by a crosshead guide 6. The crosshead 7 is connected to a crank shaft 12 by a connecting rod 8. The crank shaft 12 is carried on bearings 10. The reference numeral 9 designates a crankcase which contains lubricating oil 13 whereby the bearings 10, the crosshead 7 and other components are lubricated. The crank shaft 12 is sealed by means of a mechanical seal 11. The reference numerals 14 and 101 designate a buffer tank, and a cylinder chamber, respectively, the buffer tank being connected to a buffer chamber 102 located at the portion below the piston 2.

In operation, the pressure (PA) of the working fluid in the cylinder chamber 101 changes with time, which is so well known in the art that the description will be omitted for simplicity. The pressure (PB) in the buffer chamber 102, and the pressure (PC) in the crankcase 9 are virtually equalized to each other under the operation of the buffer tank 14, due to an arrangement where, though it is not shown, the buffer tank 14 and the crankcase 9 are connected to each other by means of a pressure equalizing pipe having an oil filter or the like. These equal pressures ensure that no difference in pressure occurs across the rolling seal 4, thereby protecting the seal against breakage under a differentiated pressure. In this way the pressure difference between the working fluid acting on the top and the bottom of the piston 2, respectively, is transmitted to the crosshead 7 through the piston rod 3, wherein the pressure difference is expressed by:

$$\Delta PW = PA - PB$$

In this way the driving force is reciprocally transmitted to the crosshead 7, and converted into a rotating force through the connecting rod 8 and the crank shaft 12. The rotating force is finally transmitted to outside as a driving power.

The inner side portion of the rolling seal 4 moves together with the piston rod 3 because of its being fixed thereto, and thus the rolling seal 4 prevents the lubricating oil 13 from splashing the inside of the cylinder 1. The mechanical seal 11 prevents the working fluid under high pressure and the lubricating oil 13 from leaking out of the crankcase 9.

As described above, in the conventional seal means the pressures in the crankcase 9 and the buffer chamber 102 are virtually equalized. Accordingly with the use of a high pressure hydrogen or helium so as to enhance the efficiency of the engine, the weight of the crankcase 9 will be disadvantageously increased because of its anti-pressure structure. The working fluid is likely to leak out of the crankcase through the mechanical seal. In addition, the rolling seal cannot withstand a long period of use because of the limited strength of the material although the sealing function is sufficient. These negative factors have made it difficult to adopt the prior art seal means in practical use in the Stirling engine.

OBJECTS AND SUMMARY OF THE INVENTION

The present invention is directed to solve the problems pointed out with respect to the conventional seal means employed in the Stirling engine, and it is an object of the present invention to provide a seal means adapted for use in the Stirling engine, which makes it possible to use a light-weight crankcase, and ensures a long, continuous sealing efficiency.

Other objects and advantages of the present invention will become apparent from the detailed description given hereinafter; it should be understood, however, that the detailed description and specific embodiment are given by way of illustration only, since various changes and modifications within the spirit and scope of the invention will become apparent to those skilled in the art from this detailed description.

According to the present invention, there is provided a seal means for use in the Stirling engine or the like, the seal means comprising:

a cylinder including a piston reciprocating therein, and a buffer chamber located in one of the spaces produced at the both sides of the piston;

a tank for storing the working fluid in the buffer chamber when the engine is at rest, the tank being located outside the cylinder;

a means for introducing the working fluid in the tank into the buffer chamber under pressure when the engine is started;

a crank shaft driven by means of the piston through a piston rod;

a crankcase for accommodating the crank shaft;

a plurality of packings for preventing the working fluid in the buffer chamber from entering the crankcase by flowing along the outer surface of the moving piston rod, the packings being arranged in contact with the outer surface of the piston rod; and a means for returning the working fluid leaked in the packings from the buffer chamber through the moving piston rod to the buffer chamber.

DETAILED DESCRIPTION OF THE PREFERRED EMBODIMENTS

Figure 1:
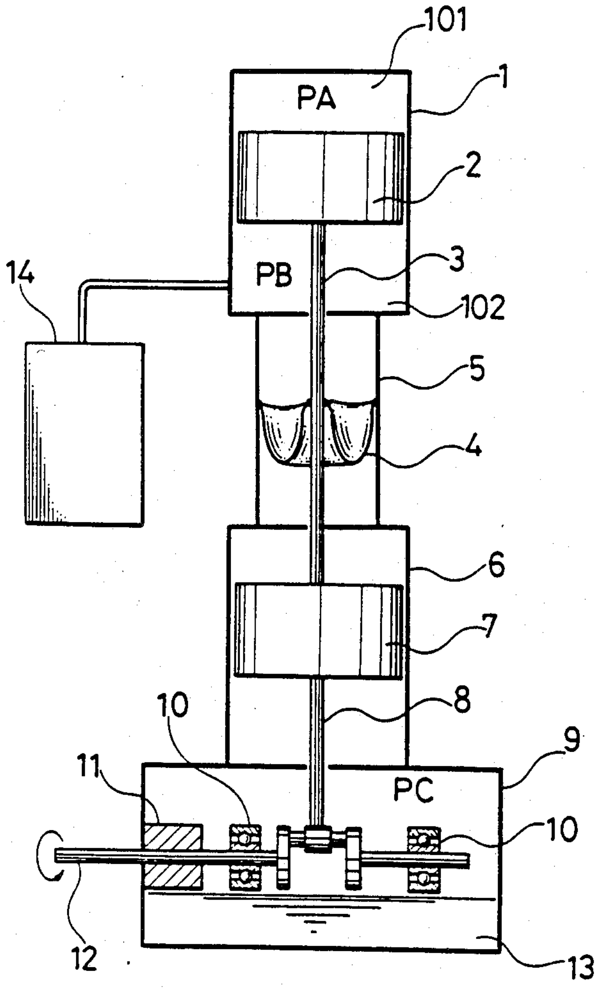
F I G .1. (PRIOR ART)
FIG. 1 is a schematic view exemplifying a prior art seal means employed in the Stirling engine.
Figure 2:
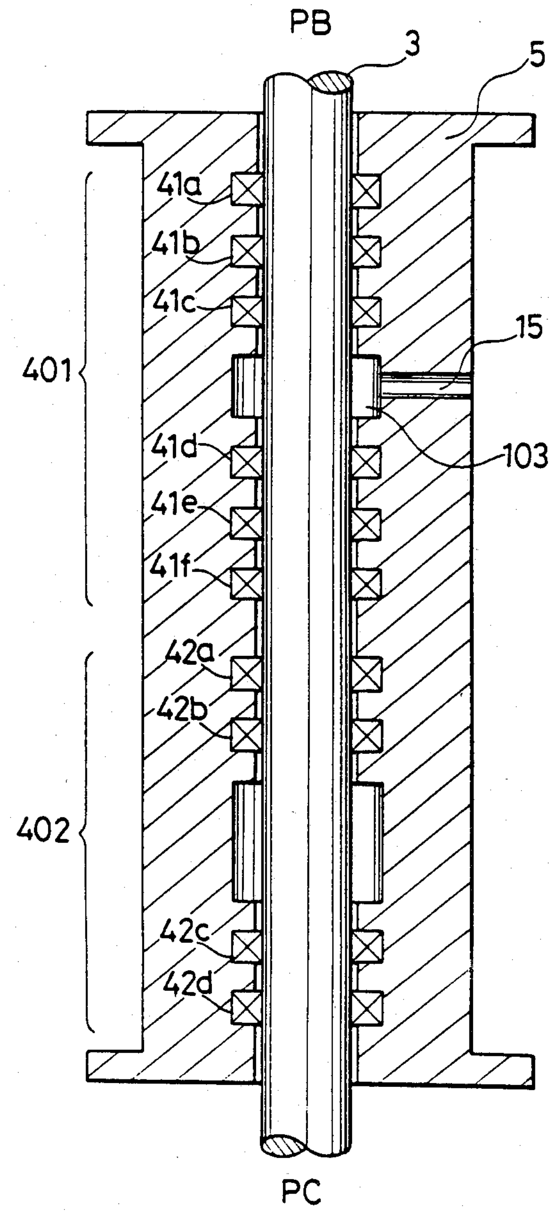
FIG. 2 is a schematic cross-sectional view on an enlarged scale showing a seal means embodying the present invention, which is applied to the Stirling engine.

The present invention will be more particularly described with reference to FIGS. 2 to 4, wherein like reference numerals designate like elements and components to those in FIG. 1:

FIG. 2 shows a rod seal arrangement provided in a lower section of a cylinder 1. The rod seal arrangement has been devised by improving the conventional sliding seal. There are provided a piston rod 3 reciprocating up and down, a seal support 5, an upper seal member 401, a lower seal member 402, a return path 15 for allowing a leaked fluid to return, and a sealing chamber 103. The upper seal member 401 includes rod packings 41*a* to 41*f* whereby the working fluid is sealed, and the lower seal member 402 includes rod packings 42*a* to 42*d* whereby the lubricating oil is sealed.

Figure 3:
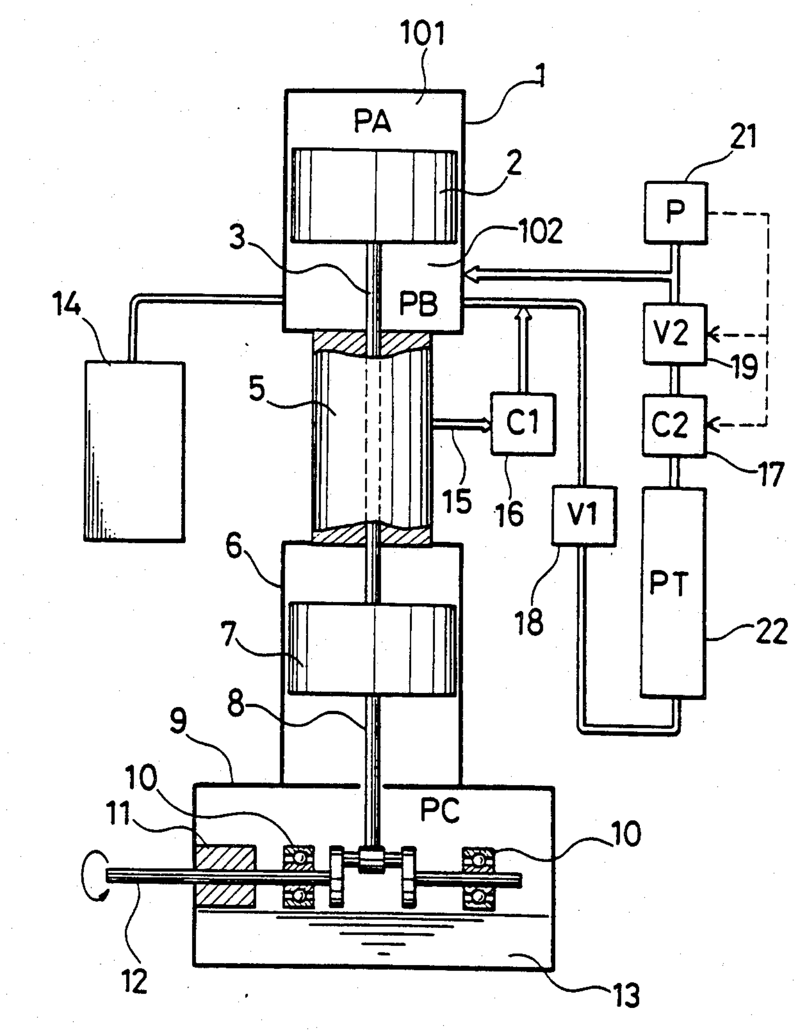
FIG. 3 is a schematic view showing the whole system of the Stirling engine to which the seal means of the invention is applied including a means for introducing the working fluid into the buffer chamber, and a means for returning leaked working fluid.

Referring to FIG. 3, the working fluid is stored in a tank 22 outside the cylinder 1, the tank 22 being connected to a buffer chamber 102 through a pipe at which a first valve (V1) 18 is provided. In addition, the tank 22 is connected to an inlet side of a second compressor (C2) 17. The outlet side of the second compressor 17 is connected to the buffer chamber 102 through a pipe at which a second valve (V2) 19 is provided. A pressure detector (P) 21 is also provided at the pipe.

The reference numeral 16 designates a first compressor (C1) designed to return the leaked fluid to the buffer chamber 102, whose inlet side is connected to the return path 15, and whose outlet side is connected to the buffer chamber 102 through a pipe.

Figure 4:
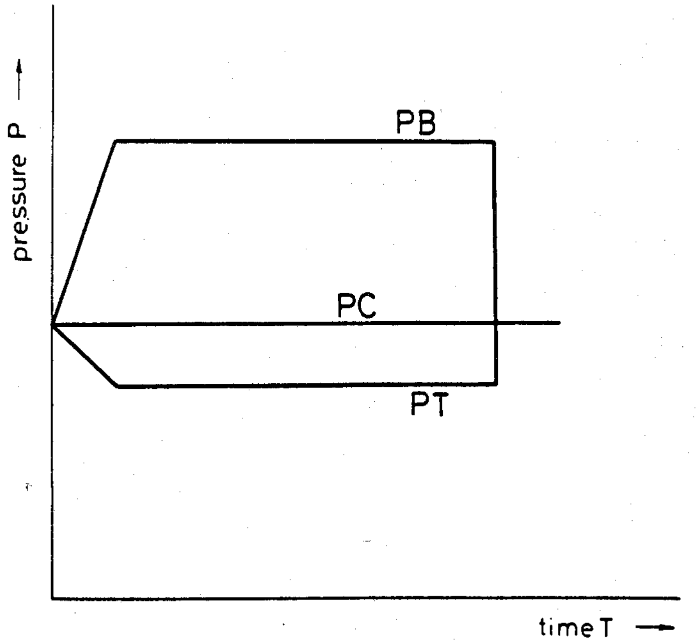
FIGS. 4 (*a*) and 4 (*b*) are diagrams showing the pressure changes with time, and the interrelated operations of the components occurring during the operation of the Stirling engine.
Figure 4:
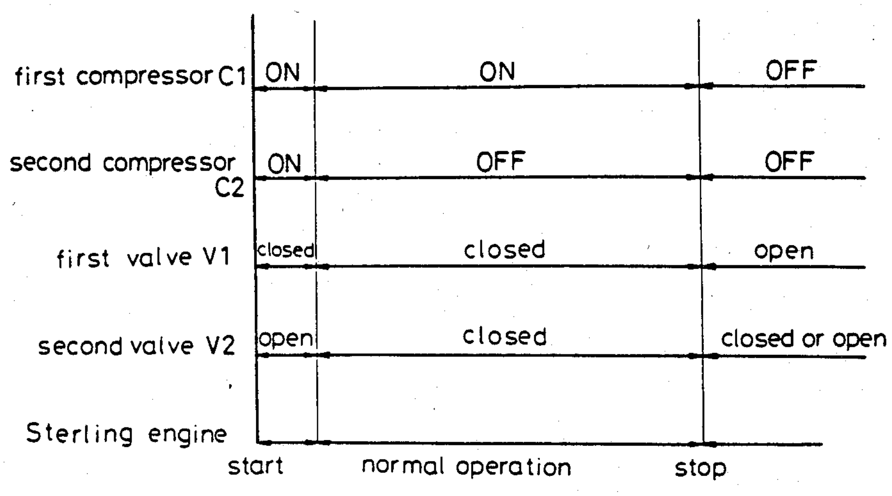

FIG. 4 (*a*) and (*b*) show how the pressure changes with time, and how the components are operated in an interrelated manner.

An example of the operation will be described, but the description of the manner of obtaining a rotary motion from the crank shaft 12 through the action of the working fluid in the cylinder 1 will be omitted because of its being well known in the art.

When the Stirling engine is at rest, the internal pressures (PA), (PB), (PC) and (PT) in the cylinder chamber 101, the buffer chamber 102, the crankcase 9 and the tank 22 are respectively equal to one another, all of which are kept low.

When the engine is to be started, the first valve 18 is closed, the second valve 19 is opened, and the second compressor 17 is operated, thereby introducing the working fluid in the tank 22 into the buffer chamber 102 under pressure. As a result, the internal pressure (PB) therein gradually rises until it reaches the pressure required to operate the engine, which is detected by the pressure detector 21 thereby to stop the second compressor 17 and to make the second valve 19 closed.

When the internal pressure (PB) in the buffer chamber 102 rises, the working fluid is caused to leak into the sealing chamber 103 through the rod packings 41*a* to 41*c*. In order to return this leaked fluid to the buffer chamber 102 under pressure, the first compressor 16 is continuously operated while the engine is in operation. The first valve 18 is closed when the engine is started and when it is in normal operation, as well.

Another group of rod packings 42*a* to 42*d* are designed to prevent the lubricating oil 13 in the crankcase 9 from splashing the sealing chamber 103 and other components inside the cylinder 1, and furthermore heat exchangers (not shown) or the like furnished to the engine. These components are kept safe from adverse influences possibly resulting from the splashed oil.

When the engine is to be stopped, the first and second compressors 16 and 17 are stopped, and the first valve 18 is opened, thereby causing the working fluid in the buffer chamber 102 to return to the tank 22. In this way the internal pressure (PB) in the buffer chamber 102 lowers until it becomes equal to the internal pressure (PC) in the crankcase 9.

By the operation described above, the Stirling engine is operated to generate a driving power with the internal pressure in the buffer chamber 102 being kept high and with that in the crankcase 9 being kept low.

In the seal means of the invention applied to the Stirling engine, it will be appreciated that the sliding seal adopted in this seal means ensures a sealing efficiency with a pressure difference between in the buffer chamber 102 and in the crankcase 9. Accordingly, it is possible to hold the inside of the crankcase 9 at a low pressure, thereby enabling to reduce the weight of the crankcase 9. When the working fluid is leaked through the sliding seal, the leaked working fluid is returned to the buffer chamber 102 by a second compressor 16, thereby enabling to hold the constant pressure in the buffer chamber 102. Furthermore, the durability of the mechanical seal 11 of the crankcase 9 is enhanced because of the low pressure inside the crankcase 9. There is an advantage that the durability of the sliding seal 5 is longer than that of the conventional rodstock seal. The pressure in the buffer chamber 102 is enough to be high only in the normal operation because of the provision of the tank 22, thereby reducing the load applied to the sliding seal.

Besides, the seal means of the present invention is not limited in application to the Stirling engine, but is widely applicable to compressors having the same structure as that of the Stirling engine.

What is claimed is:

1. A seal means for use in the Stirling engine or the like, the seal means comprising:

- a cylinder including a piston reciprocating therein, and a buffer chamber located in one of the spaces produced at the both sides of the piston;
- a tank for storing the working fluid in the buffer chamber when the engine is at rest, the tank being located outside the cylinder;
- a means for introducing the working fluid in the tank into the buffer chamber under pressure when the engine is started;
- a crank shaft driven by means of the piston through a piston rod;
- a crankcase for accommodating the crank shaft;
- a plurality of packings for preventing the working fluid in the buffer chamber from entering the crankcase by flowing along the outer surface of the moving piston rod, the packings being arranged in contact with the outer surface of the piston rod; and
- a means for returning the working fluid leaked in the packings from the buffer chamber through the moving piston rod to the buffer chamber.

2. A seal means as set forth in claim 1, wherein the means for introducing the working fluid in the tank into the buffer chamber is a compressor, whose inlet side is connected to the tank, and whose outlet side is connected to the buffer chamber through a pipe.

3. A seal means as set forth in claim 1, wherein the returning means for the leaked working fluid is a compressor, whose inlet side is connected to the packings, and whose outlet side is connected to the buffer chamber through a pipe.

4. A seal means as set forth in claim 1, wherein the inlet side of the tank is connected to the buffer chamber through a pipe at which a valve is provided, the valve being closed when the engine is started and when in operation, and being opened when the engine is at rest.

5. A seal means as set forth in claim 1, wherein the means for introducing the working fluid in the tank into the buffer chamber includes a valve which is opened when the engine is started, and which is closed when the pressure in the buffer chamber reaches a predetermined value, the means being connected to the buffer chamber through a pipe at which the valve is provided.

6. A seal means as set forth in claim 1, wherein the means for introducing the working fluid in the tank into the buffer chamber includes a control for stopping the supply of the working fluid when the pressure in the buffer chamber reaches a predetermined value.

7. A seal means as set forth in claim 6, further comprising a pressure detector for detecting the rise of the pressure in the buffer chamber up to the predetermined value; a valve means which is opened when the engine is started, and which is closed in response to the output from the pressure detector; the means for introducing the working fluid in the tank into the buffer chamber being connected to the buffer chamber through a pipe at which the valve means is provided; and a control for stopping the introduction of the working fluid into the buffer chamber in response to an output from the pressure detector.

8. A seal means as set forth in claim 1, further comprising a first valve which is closed when the engine is started and when in operation, and which is opened when the engine is at rest; a pressure detector for detecting the rise of the pressure in the buffer chamber up to the predetermined valve; a second value which is opened when the engine is started, and which is closed in response to the output from the pressure detector; and wherein the returning means is a first compressor; and wherein the means for introducing the working fluid into the buffer chamber is a second compressor; the tank being connected to the buffer chamber through a pipe at which the first valve is provided, and to the inlet side of the second compressor; the outlet side of the second compressor being connected to the buffer chamber through a pipe at which the second valve is provided; and the second compressor including a control whereby it is stopped from supplying the working fluid into the buffer chamber in response to the output from the pressure detector.

9. A seal means as set forth in claim 1, wherein the packings are sliding rod packings.

10. A seal means as set forth in claim 9, wherein the sliding rod packings are arranged at intervals along the length of the piston rod, and wherein the returning means is located at a midway point of the length of the packing arrangement.

11. A seal means as set forth in claim 10, further comprising a sealing chamber at the midway point, and the returning means is connected to the sealing chamber.

12. A seal means as set forth in claim 11, wherein the rod packings are arranged at intervals at the both sides of the sealing chamber along the length of the packing arrangement.

13. A seal means as set forth in claim 1, further comprising a second packing means for preventing the lubricating oil in the crankcase from flowing along the outer surface of the piston rod and entering the joint section between the packings for the working fluid and the returing means; the second packing means being located below the packings for the working fluid, and arranged in contact with the outer surface of the piston rod.

14. A seal means as set forth in claim 13, wherein the second packing means comprises sliding rod packings.

15. A seal means as set forth in claim 14, wherein the sliding rod packings are arranged in plurality at intervals along the length of the piston rod.

16. A seal means as set forth in claim 1, further comprising a second packing means for preventing the lubricating oil in the crankcase from flowing along the outer surface of the piston rod and entering the joint section between the packings for the working fluid and the returning means; and wherein the packings for the working fluid and the second packing means are both sliding rod packings arranged in plurality at intervals along the length of the piston rod.

17. A seal means as set forth in claim 16, further comprising a sealing chamber located at a midway point of the arrangement of the sliding rod packings for the working fluid and those as the second packing means, the sealing chamber being connected to the returning means, and wherein the sliding rod packings are arranged at intervals at the both sides of the sealing chamber along the length of the packing arrangement.

* * * * *